G. S. BLANKENHORN.
ABRASION TESTING MACHINE.
APPLICATION FILED FEB. 9, 1917.

1,386,087.

Patented Aug. 2, 1921.

Inventor
G. S. Blankenhorn
by
Attorney

UNITED STATES PATENT OFFICE.

GEORGE S. BLANKENHORN, OF MILWAUKEE, WISCONSIN.

ABRASION-TESTING MACHINE.

1,386,087.   Specification of Letters Patent.   Patented Aug. 2, 1921.

Application filed February 9, 1917. Serial No. 147,931.

*To all whom it may concern:*

Be it known that I, GEORGE S. BLANKENHORN, a citizen of the United States, residing at Milwaukee, in the county of Milwaukee and State of Wisconsin, have invented a certain new and useful Improvement in Abrasion-Testing Machines, of which the following is a specification.

This invention relates to improvements in the construction of machines for testing the abrasion resisting qualities of materials.

An object of the invention is to provide a machine for testing the abrasion resisting qualities of materials, which is simple in construction and efficient in operation. Another object is to provide a machine in which accurate comparative tests of different materials may be made under like conditions, without necessity of having all of the various materials under test at the same time. A further object is to provide an abrasion testing machine in which test-bars of circular cross section or of any other shape, may be tested.

A clear conception of an embodiment of the invention may be had by referring to the drawing accompanying and forming a part of this specification in which like reference characters designate the same or similar parts in the various views.

Figure 1:
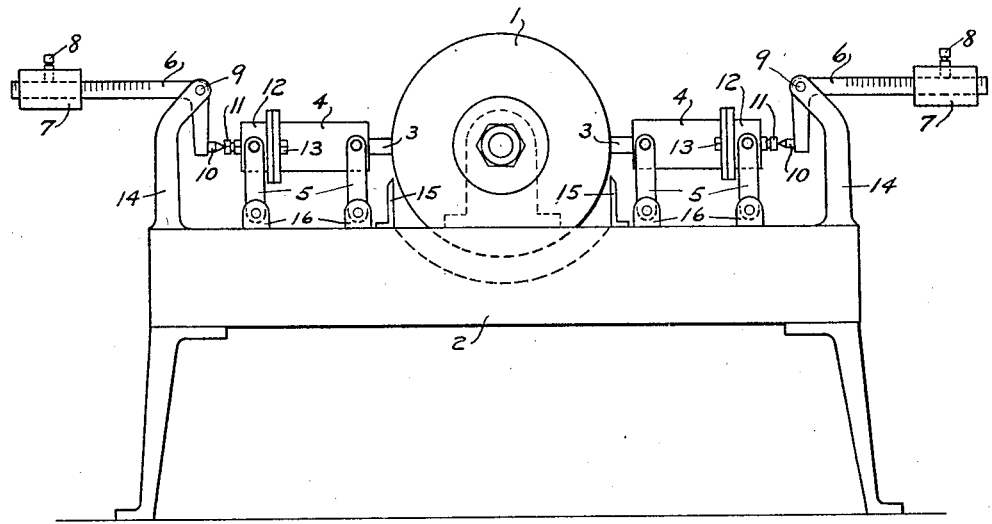
Figure 1 is an elevation of an abrasion testing machine, showing two test-bars of material under test.

The emery wheel 1, or other means for reducing materials by abrasion, is rotatably mounted in one or more suitable bearings supported by the main frame 2 and is preferably driven at a predetermined speed by any suitable means such as a rotary or reciprocating motor, either through suitable transmission gearing or direct. The speed of the motor is preferably controllable so that the peripheral velocity of the emery wheel 1 may be maintained constant irrespective of variations in diameter of the emery wheel. The emery wheel 1 may be provided with a suitable guard and has adjustable water shields 15 mounted upon the frame adjacent the wheel periphery.

The main frame 2 is provided with a number of ears 16 to which parallel vertical links 5 are pivotally secured. The upper ends of the parallel links 5 are pivotally connected to the test-bar carriers 4 by means of cap screws 18. The test-bar carriers 4 are thus supported to move so that their longitudinal axes will assume parallel positions and will remain substantially radial relative to the emery wheel 1. The pivots between the carriers 4, links 5 and ears 16 may be provided with ball bearings or otherwise formed to reduce the friction to a minimum.

Figure 2:
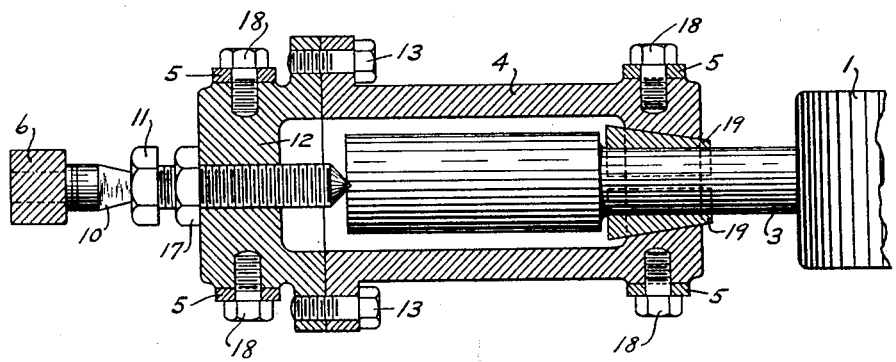
Fig. 2 is an enlarged horizontal central section through one of the test-bar carriers, showing a test-bar clamped therein and engaging a fragment of the emery wheel.

The carriers 4 are formed hollow as disclosed in Fig. 2, and are provided with caps 12 which are detachably secured to the carrier body portions by means of cap screws 13. The ends of the carriers 4 adjacent the emery wheel 1 are provided with tapered openings within which are located the test-bar clamping wedges 19. The wedges 19 have inner portions formed to grip the test-bars 3. The carrier caps 12 are provided with adjustable set screws 11 having pointed ends adapted for engagement with the ends of the test-bars 3. The test-bars 3 may be forced forward by means of the set screws 11, thereby forcing the wedges 19 forward and inwardly to firmly grip the test-bars 3. The set screws 11 may be locked in adjusted position by means of lock nuts 17.

The main frame 2 is provided with upwardly extending brackets 14 upon which the weighted bell cranks 6 are mounted by means of pivots 9. The horizontal arms of the bell cranks 6 are preferably graduated and are provided with sliding weights 7 which may be locked in adjusted position by means of set screws 8. The vertical arms of the bell cranks 6 are provided with adjustable knife edges 10 which engage the set screws 11. The bell crank pivots 9 may be provided with ball bearings or otherwise formed to reduce the friction to a minimum.

In making a test, a test-bar 3 of the material having a predetermined cross section, is first placed in a carrier 4 and clamped therein as shown in Fig. 2. The carrier 4 is then mounted upon its supporting links 5 with the test-bar 3 in engagement with the emery wheel 1 and with the knife edge 10 of the adjacent bell crank 6 in engagement with the set screw 11. The weight 7 of the bell crank 6 is then placed in an adjusted position to produce a force of predetermined value urging the carrier 4 forward and pressing the test-bar 3 against the emery wheel 1. The emery wheel 1 is then rotated at a predetermined peripheral speed. The operation of the wheel is continued until the test-bar 3 has been worn down a predetermined amount or for a predetermined period of time. The conditions existing during the test as well as the period of operation are carefully tabulated, thus completing the test. By operating the apparatus under like conditions at any time, a comparative test of the same or of other materials, may be secured.

If it is desired to make a comparative test of two materials at the same time, this may be done by placing test-bars of the two kinds of material in the carriers 4 on opposite sides of the emery wheel 1. By adjusting the weights 7 on the individual bell cranks 6 so as to produce equal pressure per unit area on the two test-bars and operating the emery wheel 1, an immediate comparative test of the two kinds of materials results.

It will be noted that so long as the weighted arms of the bell crank 6 are in substantially horizontal position, and with the test-bars 3 maintained in substantially radial position relative to the emery wheel 1, the engaging pressures will remain substantially constant. The slight inaccuracies resulting from the differences in positions of the bell cranks 6 and links 5, as well as from the gradual slight reduction in diameter of the emery wheel 1, are negligible in ordinary tests of this kind. These inaccuracies may be reduced to a minimum by constructing the horizontal arms of the bell cranks 6 and adjusting the knife edges 10, so that the weights 7 will be slightly above the horizontal plane of the axes of the pivots 9 at the commencement of a test, and will be the same amount below such plane when the test has been completed. The links 5 may also be made to swing equal amounts on opposite sides of the vertical planes passing through their lower pivots during a test, by making the ears 16 adjustable. The carriers 4 may be maintained substantially radial relative to the emery wheel 1 by making the links 5 of such length that at the beginning and end of a test the axes of the carriers will be slightly below the horizontal plane of the axis of the emery wheel 1, and slightly above such plane when the test has been half completed. The peripheral velocity of the emery wheel 1 may be maintained substantially constant by increasing the speed of rotation as the wheel periphery wears down.

It should be understood that it is not desired to be limited to the exact details herein shown and described, for obvious modifications may occur to a person skilled in the art.

It is claimed and desired to secure by Letters Patent:—

1. In combination, means for reducing materials by abrasion, means for holding a sample of material, means for guiding one of said means to effect motion of translation thereof, and means for urging said reducing and said holding means horizontally relatively toward each other with substantially constant force.

2. In combination, means for reducing materials by abrasion, means for holding a sample of material, means for guiding said holding means to effect motion of translation thereof, and means for urging said holding means horizontally toward said reducing means with substantially constant force.

3. In combination, movable means for reducing materials by abrasion, means for holding a plurality of samples of materials horizontally and in engagement with said reducing means, and means for simultaneously urging said reducing and all of said holding means horizontally relatively toward each other with substantially constant forces whereby a comparative abrasive test of said samples is obtained.

4. In combination, rotary means for reducing materials by abrasion, means for holding a plurality of samples of materials horizontally and in engagement with said reducing means, and means for simultaneously urging all of said holding means horizontally toward said reducing means with substantially constant forces whereby a comparative abrasive test of said samples is obtained.

5. In combination, movable means for reducing materials by abrasion, and means for simultaneously urging said reducing means and a plurality of samples of material horizontally relatively toward each other, said urging means being arranged to produce constant engaging pressure between said reducing means and said samples regardless of variations in the weight of said samples whereby a comparative abrasive test of said samples is obtained.

6. In combination, rotary means for reducing materials by abrasion, and means for simultaneously urging said reducing means and a plurality of samples of material relatively toward each other in a substantially horizontal direction whereby a comparative abrasive test of said samples is obtained.

7. In combination, means for reducing materials by abrasion, a sample carrier, a set of parallel suspension links for effecting motion of translation of said carrier toward said reducing means, and means associated with said carrier for urging the same toward said reducing means with substantially constant force.

8. In combination, a rotary emery-wheel, a pair of horizontal sample carriers disposed radially of said wheel and located on opposite sides thereof, a set of parallel suspension links for effecting motion of translation of each of said carriers toward said wheel, and a weight associated with each of said carriers for urging the same toward said wheel with substantially constant force.

In testimony whereof, the signature of the inventor is affixed hereto.

GEORGE S. BLANKENHORN.